United States Patent
Klima

(10) Patent No.: US 10,545,718 B2
(45) Date of Patent: Jan. 28, 2020

(54) APPLICATION PROGRAM WITH RECORDED USER'S VOICE FOR ELECTRONIC DEVICES, INCLUDING A MOBILE PHONE

(71) Applicant: Jeffry L. Klima, Seattle, WA (US)

(72) Inventor: Jeffry L. Klima, Seattle, WA (US)

(73) Assignee: Jeffry L. Klima, Seattle, WA (US)

(*) Notice: Subject to any disclaimer, the term of this patent is extended or adjusted under 35 U.S.C. 154(b) by 0 days.

(21) Appl. No.: 15/637,991

(22) Filed: Jun. 29, 2017

(65) Prior Publication Data

US 2019/0004765 A1   Jan. 3, 2019

(51) Int. Cl.
*G06F 3/16* (2006.01)
*G06F 16/638* (2019.01)
*G10H 1/00* (2006.01)

(52) U.S. Cl.
CPC ............ *G06F 3/162* (2013.01); *G06F 16/639* (2019.01); *G10H 1/0025* (2013.01)

(58) Field of Classification Search
CPC .. G06F 3/162; G06F 17/30772; G10H 1/0025
USPC .......................................................... 84/625
See application file for complete search history.

(56) References Cited

U.S. PATENT DOCUMENTS

| | | | | |
|---|---|---|---|---|
| 4,286,294 A * | 8/1981 | Nakauchi | ............. | G11B 20/225 360/27 |
| 4,287,568 A * | 9/1981 | Lester | .................. | G10H 1/0041 365/1 |
| 4,339,980 A * | 7/1982 | Hooke | ................. | G10H 1/0033 360/12 |
| 4,391,530 A * | 7/1983 | Wakabayashi | ....... | G04G 9/0064 365/45 |
| 4,786,983 A * | 11/1988 | Massari | ................... | G09B 5/04 360/13 |
| 5,014,317 A * | 5/1991 | Kita | ....................... | G04G 13/00 704/274 |
| 5,224,864 A | 7/1993 | Vavagiakas | | |
| 5,504,269 A * | 4/1996 | Nagahama | .......... | G09B 15/003 84/453 |
| 5,951,302 A * | 9/1999 | Decker, Jr. | ............ | G11B 31/00 434/156 |
| 6,808,473 B2 | 10/2004 | Hisano et al. | | |
| 6,969,797 B2 * | 11/2005 | Brinkman | .............. | G06Q 20/00 84/625 |
| 6,998,961 B2 * | 2/2006 | Stihler | ................... | G04G 13/00 340/309.16 |
| 7,030,311 B2 * | 4/2006 | Brinkman | .............. | G06Q 20/00 709/203 |
| 7,354,380 B2 | 4/2008 | Volpe, Jr. | | |
| 7,519,327 B2 | 4/2009 | White | | |
| 7,643,895 B2 * | 1/2010 | Gupta | ................. | A43B 3/0005 482/1 |
| 8,001,472 B2 | 8/2011 | Gilley et al. | | |
| 8,064,295 B2 | 11/2011 | Palmer | | |

(Continued)

*Primary Examiner* — David S Warren
*Assistant Examiner* — Christina M Schreiber
(74) *Attorney, Agent, or Firm* — Jensen & Puntigam D.S.; Clark A. Puntigam

(57) ABSTRACT

An application program for a mobile device includes a capability for recording and storing a user's voice; a play list of music or other sounds, and a system for combining the user's voice recording with the selected music or sounds in a looped combined recording. The user begins and stops the looped combined recording by controls on the mobile device.

10 Claims, 3 Drawing Sheets

(56) References Cited

U.S. PATENT DOCUMENTS

| | | | |
|---|---|---|---|
| 8,568,277 B2 | 10/2013 | Johnson | |
| 8,568,278 B2 * | 10/2013 | Riley | A63B 24/0006 |
| | | | 482/9 |
| 8,718,237 B2 * | 5/2014 | Tagawa | H04M 19/041 |
| | | | 379/78 |
| 8,858,400 B2 | 10/2014 | Johnson | |
| 9,286,877 B1 * | 3/2016 | Dabby | B42D 15/022 |
| 2002/0045438 A1 * | 4/2002 | Tagawa | H04M 1/72519 |
| | | | 455/412.1 |
| 2003/0058752 A1 | 3/2003 | Birnbach et al. | |
| 2004/0089141 A1 * | 5/2004 | Georges | G10H 1/0025 |
| | | | 84/609 |
| 2004/0171377 A1 * | 9/2004 | Engstrom | G06Q 30/02 |
| | | | 455/419 |
| 2007/0078294 A1 | 4/2007 | Jain et al. | |
| 2007/0294297 A1 * | 12/2007 | Kesteloot | G06F 16/68 |
| 2009/0118849 A1 * | 5/2009 | Dery | G03B 17/53 |
| | | | 700/94 |
| 2009/0164902 A1 * | 6/2009 | Cohen | G10H 1/0025 |
| | | | 715/716 |
| 2010/0199833 A1 * | 8/2010 | McNaboe | G10H 1/0025 |
| | | | 84/625 |
| 2010/0223314 A1 * | 9/2010 | Gadel | G11B 27/034 |
| | | | 709/200 |
| 2013/0070093 A1 * | 3/2013 | Rivera | G11B 27/002 |
| | | | 348/143 |
| 2014/0000440 A1 * | 1/2014 | Georges | G10H 7/00 |
| | | | 84/609 |
| 2014/0105411 A1 * | 4/2014 | Santos | G10H 1/361 |
| | | | 381/66 |
| 2014/0121797 A1 * | 5/2014 | Ales | G11B 20/10 |
| | | | 700/94 |
| 2014/0270181 A1 * | 9/2014 | Siciliano | G11B 27/038 |
| | | | 381/17 |
| 2015/0287403 A1 * | 10/2015 | Holzer Zaslansky | |
| | | | G06T 13/205 |
| | | | 704/231 |
| 2015/0297109 A1 * | 10/2015 | Garten | A61B 5/04845 |
| | | | 600/544 |
| 2015/0314102 A1 | 11/2015 | Rosenberg | |
| 2016/0001159 A1 | 1/2016 | Riley et al. | |
| 2017/0055063 A1 * | 2/2017 | Ben-Ami | G06F 13/00 |
| 2017/0092253 A1 * | 3/2017 | Wood | G10H 1/368 |
| 2017/0180438 A1 * | 6/2017 | Persson | G10L 21/013 |
| 2019/0004765 A1 * | 1/2019 | Klima | G06F 3/162 |

* cited by examiner

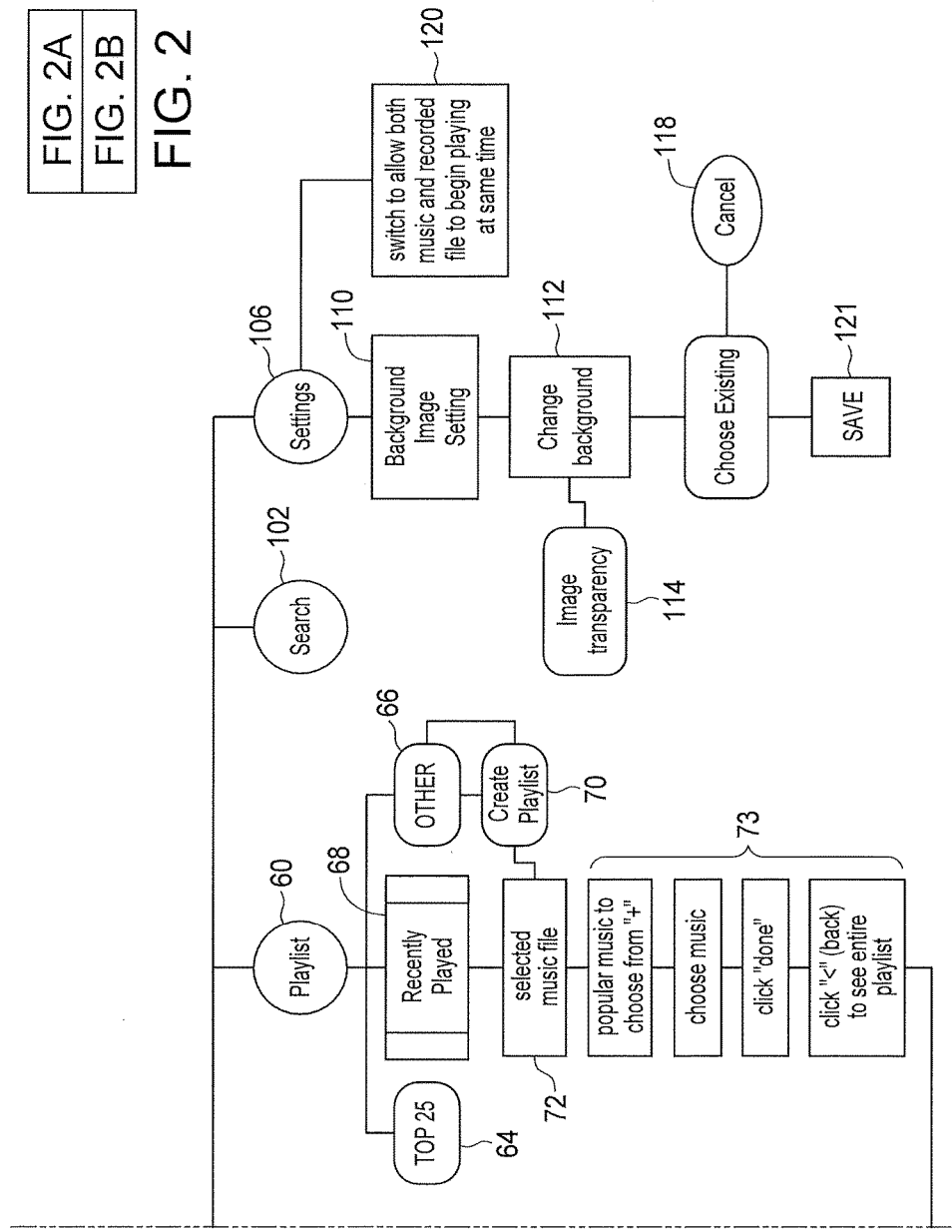

APPLICATION PROGRAM WITH RECORDED USER'S VOICE FOR ELECTRONIC DEVICES, INCLUDING A MOBILE PHONE

TECHNICAL FIELD

This invention relates generally to apps, i.e. application programs, for mobile phones as well as other electronic devices and more specifically concerns a user defined combination of voice and music.

BACKGROUND OF THE INVENTION

Motivational, inspirational and relaxation recordings abound in the marketplace. These recordings typically consist of music with a voice over, typically provided by a professional or well-known speaker. However these recordings are static, unchangeable and often become boring, losing their motivational effects. It is still recognized, however, that a combination of voice and music can be effective for motivation, inspiration and relaxation.

SUMMARY OF THE INVENTION

Accordingly the invention includes an application program for installation and use on a mobile phone or other electronic device, capable of running an app, comprising: a recording system for recording and storing a message generated by a user with the user's own voice; a play list of individual items of music, tunes or other sounds; a system for combining the user's recorded voice with a selected one of the individual items from the play list into a combined recording, and selecting a time loop for the combined recording; and a recording control for initiating and terminating running of the combined recording.

BEST MODE FOR CARRYING OUT THE INVENTION

The present invention is a combination of a user's recorded voice and music selected from an existing source, such as iTunes, present in the smart phone, or any other music play list, as well as any other material such as sounds of nature, including surf sounds, other nature sounds, animal sounds and others.

The combination of the user's own recorded voice and existing music or other material is created in the form of an application program (app) for a smart phone 10. The smart phone includes a display 12 and various button or tab controls which allow the user to create a combined recording for a looping, controlled play. Examples of smart phones include an iPhone, Android or other system. Further, other electronic devices capable of running an app can be used, including PCs, laptops and tablets.

Figure 1:
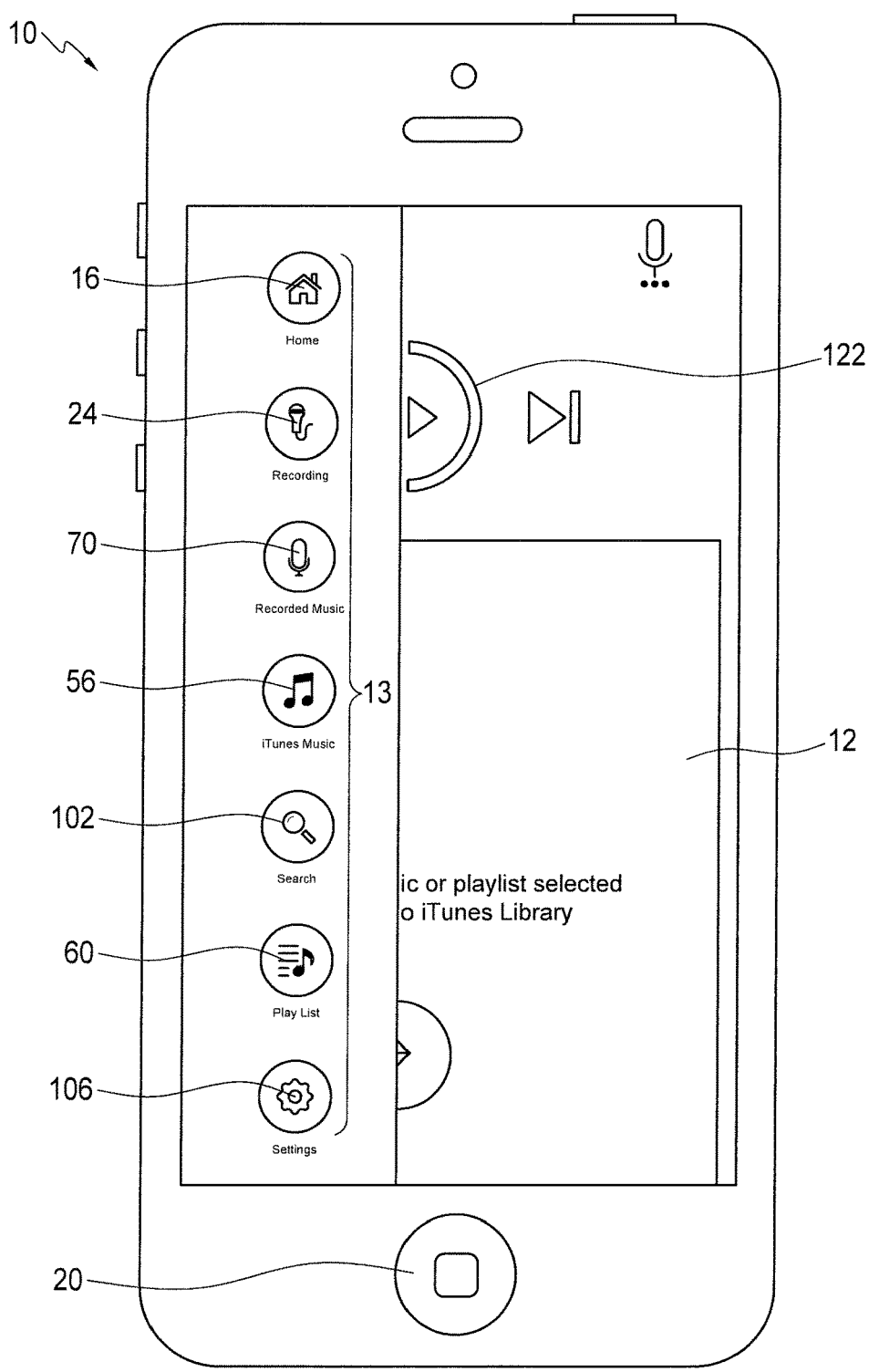
FIG. 1 shows a generic smart phone with a display and controls, with some controls or buttons used for construction of voice/music combinations and others for the playing of the combinations.
Figures 2, 2A, 2B:
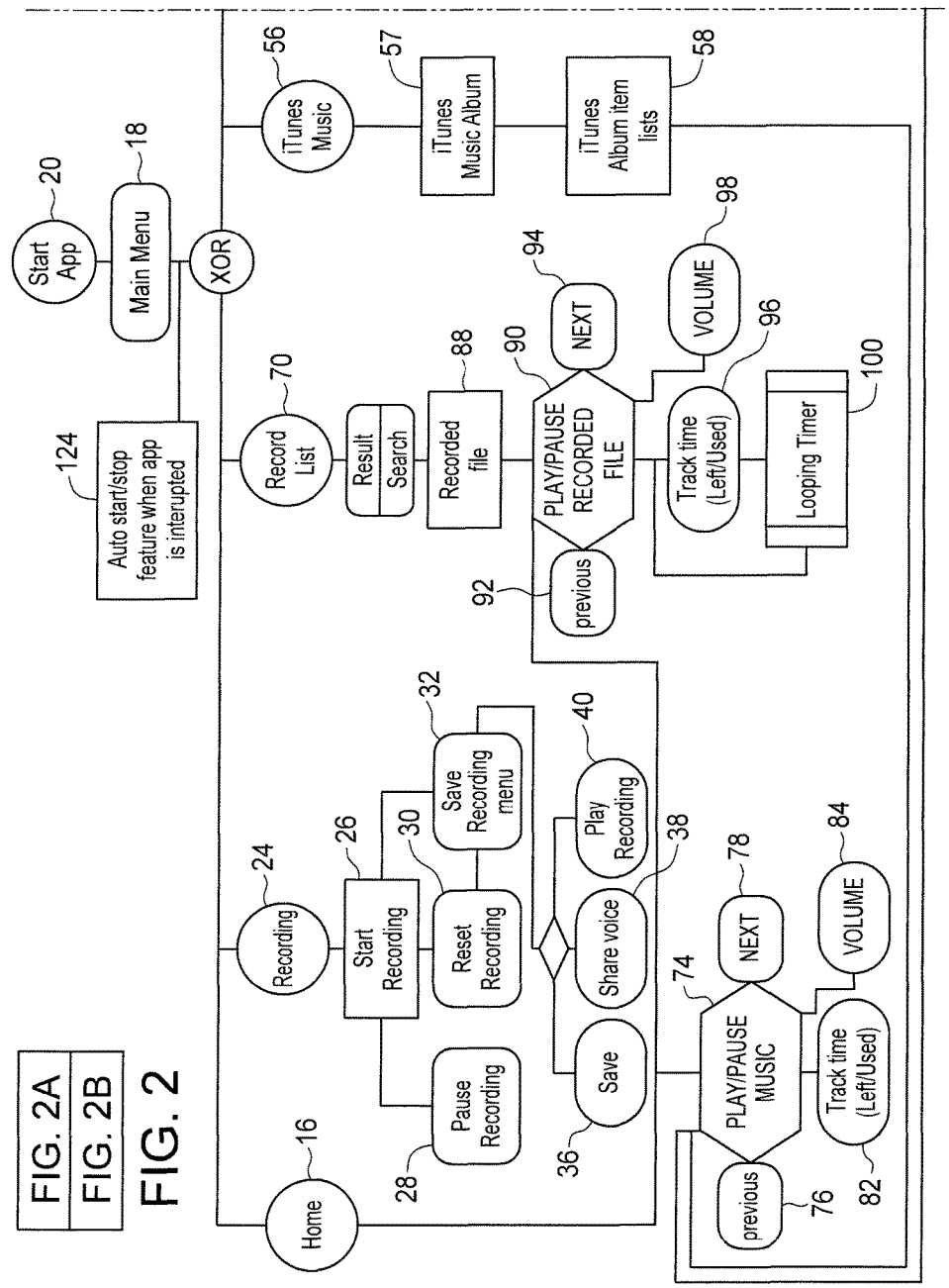
FIG. 2A is a first part diagram of the application program, with an identification of controls.
FIG. 2B is a second part diagram of the application program

FIG. 2 shows a flow chart for the app. The controls include a "home" button 16 from a main menu screen 18, following the use of a start button 20. A first control button 24 is for recording of a user's voice. The recording begins at 26. The recording can be paused at 28 or can be reset at 30. If desired, the recording can be saved at 32 to a menu. The menu could include several voice recordings, typically 2-3 but could be more. Each recording will be typically somewhere between 15-30 seconds. A new recording can be saved at 36, shared with others at 38, or played at 40. Each separate recording will typically have a name.

The music of the combination is typically iTunes music accessed by button 56, in the form of an iTunes album. The iTunes music album 57 is an existing inventory of music which is already installed on an iPhone. A play list can also be created from iTunes as shown at iTunes tunes list 58, or other source of music.

Alternatively, a play list 60 can be present on the phone, created for instance from a top 25 list shown at 64 or other tunes represented at 66. Recently played tunes are available at 68. The play list can be then created at 70 to form the music portion of the combination. The final selected music file is shown at 72. A selected tune can then be played or paused from the iTunes album list or the selected music file as shown at 74. Steps shown at 73 populate the music. A previous tune from the list at 76 or the next tune in the file can then be selected at 78. In each case, the track time of the tune is shown at 82. The volume of the tune is controlled and displayed at 84.

Music from the record list, accessed by button 70, is combined or merged with the user's own voice recording to construct a recorded combined file at the time of use. Without the use of the app to merge the two files, they remain separate. There could be several file merger possibilities which can be searched. Alternatively, files can be merged to create a new combination. The merged file at 88 can be played or paused at 90. A previous merged file 92 or the next recorded file in the list 94 can also be played. Each possible merged file is preferably approximately 15-30 seconds. The track time of the merged file can be displayed at 96 and the volume at 98. A looping timer 100 is then established at 100, so that the selected file is repeated at intervals as the user is working out, walking, resting or anytime inspirational support or relaxation is desired.

This completes the creation of the combined user voice/music programs. When started by a switch 120, the voice/music combination typically plays with the voice recording looping in the background for the established length of time (15-30 seconds) under control of the timer.

Another feature of the app when playing is a stop/start interruption of the playing if a phone call is received shown at 124 FIG. 2. When the call is terminated, play resumes at the point of interruption.

The display can also include a search button 102 for the menu as well as a number of settings, accessed by button 106. Settings include a background image 110. The background image can also be used as a form of positive reinforcement, including a snapshot of a desired end result, such as a desired physical condition or improved monetary condition. The background image can be changed at 112, with the transparency of the image being controlled at 114. The existing image at 114 can be cancelled at 118 or saved at 121.

In operation, the user initiates the app with switch 122, which responds with the combination of the user's voice and the selected music in a looping fashion. The recorded file may be changed by the user, selecting a previous combination or a next combination.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. An application program for installation and use on a user's mobile phone, capable of running an app, comprising:
   a recording system for recording and storing a message generated by a user with the user's own voice;
   a play list of individual items of music, tunes or other sounds;
   a system for combining the user's recorded voice with a selected one of the individual items from the play list into a combined recording, selecting a time loop for the combined recording and playing the combined recording back locally to the user through the mobile phone, wherein the mobile phone is capable of receiving calls during playing of the combined recording;
   a recording control for initiating and terminating running of the combined recording on the user's mobile phone; and
   including an interrupt or stop of the combined recording when a call is received on the user's mobile phone, and for starting the combined recording at the point in the combined recording where the combined recording was stopped when the received call is terminated.

2. The application program of claim 1, including a volume control for the user's voice and/or the music or other sounds.

3. The application program of claim 2, including a display for the volume.

4. The application program of claim 1, including a selection system for determining the timing of the loop.

5. The application program of claim 1, including a stop/start control for the looping combination during running of the combined program.

6. The application program of claim 1, including a display showing track time left and/or used during playing of the combined recording.

7. The application program of claim 1, including a display menu for the application program.

8. The application program of claim 1, including control over the background image for the menu display.

9. The system of claim 1, including a plurality of stored combined recordings, and an access control permitting a user to access recordings and to select one for playing.

10. The system of claim 1, including a plurality of stored user messages.

* * * * *